(12) United States Patent
Piña et al.

(10) Patent No.: US 8,718,425 B2
(45) Date of Patent: May 6, 2014

(54) APPARATUS AND METHOD FOR BEND RADIUS CONTROL OF FIBER OPTIC CABLE ASSEMBLIES

(75) Inventors: Francisco Luna Piña, Hickory, NC (US); Wesley Allan Yates, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 2 days.

(21) Appl. No.: 13/484,339

(22) Filed: May 31, 2012

(65) Prior Publication Data

US 2012/0308184 A1    Dec. 6, 2012

Related U.S. Application Data

(60) Provisional application No. 61/491,405, filed on May 31, 2011.

(51) Int. Cl.
*G02B 6/44* (2006.01)
*G02B 6/54* (2006.01)

(52) U.S. Cl.
USPC ........................................... 385/102; 385/136

(58) Field of Classification Search
USPC ................................................. 385/102, 136
See application file for complete search history.

(56) References Cited

U.S. PATENT DOCUMENTS

| 4,412,878 A * | 11/1983 | Guazzo ........................... 156/91 |
| 5,863,083 A * | 1/1999 | Giebel et al. .................. 294/219 |
| 6,993,237 B2 | 1/2006 | Cooke et al. ................... 385/135 |
| 2010/0092135 A1* | 4/2010 | Barker et al. ................... 385/76 |

FOREIGN PATENT DOCUMENTS

| EP | 2159616 A1 | 3/2010 | ............... G02B 6/44 |
| WO | 2008/091482 A1 | 7/2008 | ............... G02B 6/44 |

* cited by examiner

*Primary Examiner* — Omar Rojas
(74) *Attorney, Agent, or Firm* — Adam R. Weeks

(57) ABSTRACT

A cable assembly, for example, a pulling grip for pulling a trunk cable assembly having a plurality of cable legs may include at least one pliable core for receiving the cable legs, the cable legs being wrapped at least one time around the at least one pliable core causing distal ends of the cable legs to be a distance from a furcation point, the distance being shorter than the length of the cable legs, the cable assembly further providing protection from exceeding a minimum bend radius and enabling a relatively short pulling grip.

17 Claims, 10 Drawing Sheets

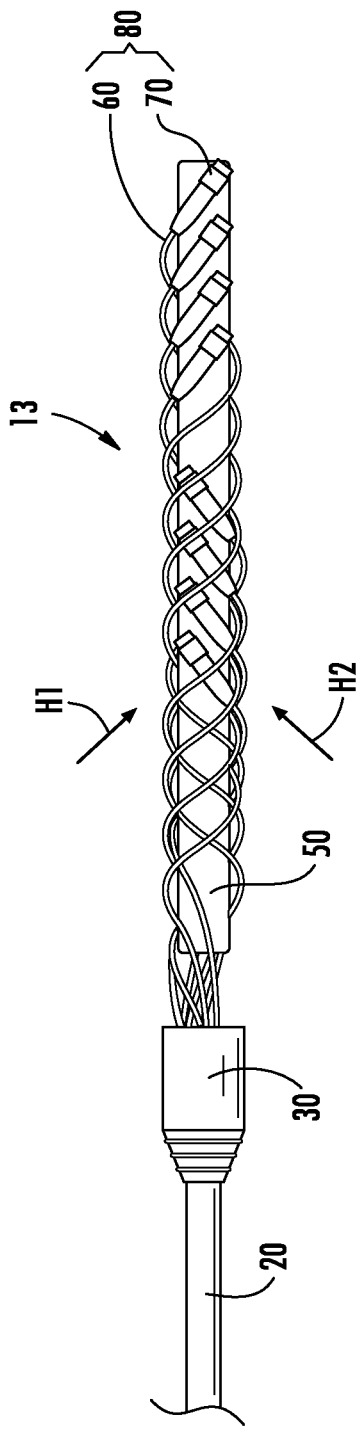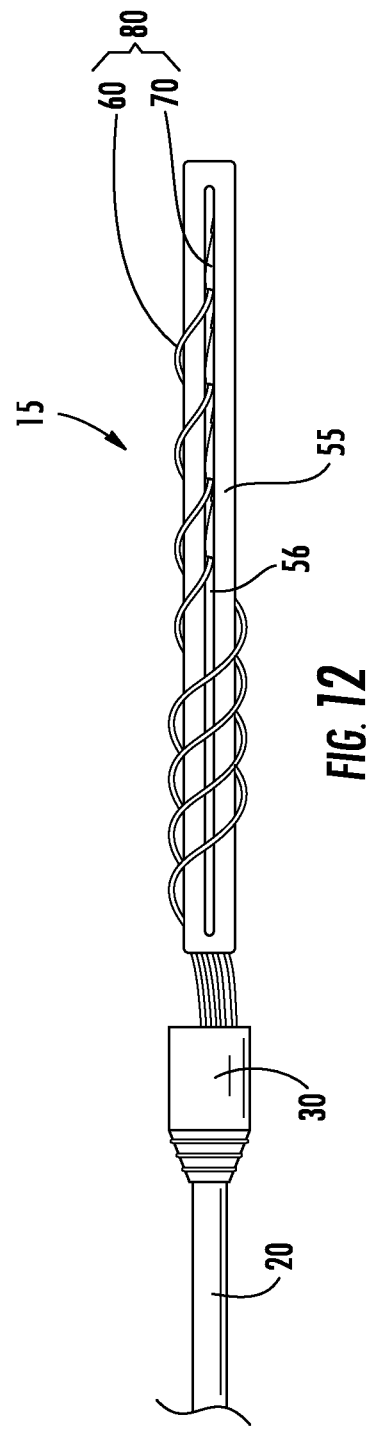

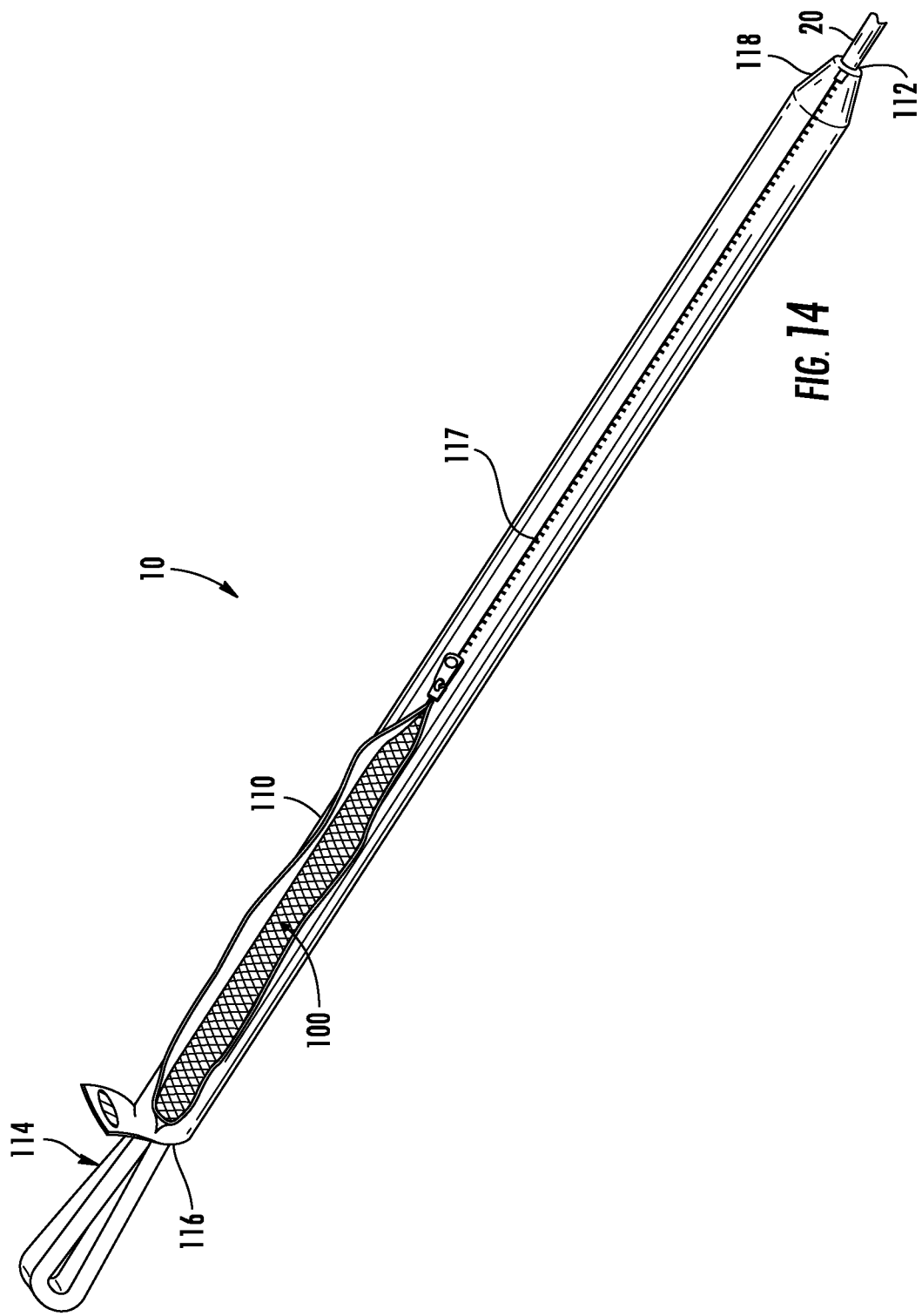

APPARATUS AND METHOD FOR BEND RADIUS CONTROL OF FIBER OPTIC CABLE ASSEMBLIES

RELATED APPLICATION

This application claims the benefit of priority under 35 U.S.C. §119 of U.S. Provisional Application No. 61/491,405 filed on May 31, 2011, the content of which is relied upon and incorporated herein by reference in its entirety.

BACKGROUND

1. Technical Field

The disclosure relates generally to fiber optic cable assemblies and more particularly to bend radius control of fiber optic cable assemblies within a pulling grip, including associated apparatuses and methods.

2. Field of the Disclosure

So called pre-connectorized trunk assemblies require protection for the connectors and legs while in packaging and while being pulled through cable conduits or ducts, or over sheaves. Cable legs require some means to secure them while in packaging or in pulling grips to ensure the legs do not get bent to a radius smaller than a recommended minimum bending radius. The length of pulling grips can be minimized by folding legs over in some controlled fashion.

Connectors in pulling grips are currently bundled together or the legs are made to different lengths, with a slightly staggered formation. By staggering the connector placement, the diameter of pulling grips can be made smaller enabling trunks to be pulled in smaller ducts or enabling the use of more trunks per duct. What is needed is a fiber optic assembly with a pulling grip that minimizes pulling grip length and diameter while protecting the cable legs and connectors inside.

No admission is made that any reference cited herein constitutes prior art. Applicant expressly reserves the right to challenge the accuracy and pertinency of any cited documents.

SUMMARY

One embodiment of the disclosure relates to a cable assembly, for example, a trunk assembly, the assembly comprising at least one fiber optic trunk cable, the at least one fiber optic trunk cable including a jacket and at least one optical fiber extending beyond the jacket; at least one cable leg having a first length, the at least one cable leg being associated with the fiber optic trunk cable and containing the at least one optical fiber; at least one connector assembly, the at least one connector assembly in communication with the at least one optical fiber and being operatively connected to an end the at least one cable leg; and at least one pliable core having a second length, the at least one pliable core associated with the at least one cable leg, the cable leg being wrapped at least one time around the at least one pliable core, the second length being shorter than the first length.

An additional embodiment of the disclosure relates to a method of making a cable assembly, the method comprising the steps of: providing a furcated optical cable assembly, the furcated optical cable assembly including at least one trunk cable, at least one furcation point and at least one cable leg having at least one optical connector on an end; providing a coupler; providing a convoluted sleeve; providing an expandable mesh; providing a pulling sock; providing at least one pliable core; wrapping the at least one cable leg around the at least one pliable core, causing the at least one optical connector to be a distance from the furcation point; installing the coupler about the furcation point; inserting the wrapped pliable core into the convoluted sleeve; mating the convoluted sleeve to the coupler; sliding the expandable mesh over the convoluted sleeve; securing the expandable mesh to the coupler and the convoluted sleeve; and installing the pulling sock about the coupler, the sleeve, the expandable mesh, and the wrapped pliable core to make the cable assembly.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 11 is a side view of another exemplary pre-connectorized trunk assembly having connectorized cable legs wrapped around a pliable core;

FIG. 12 is a side view of yet another exemplary pre-connectorized trunk assembly having connectorized cable legs wrapped around a pliable core and having respective multi-fiber connectors tucked into a receiving slot of the pliable core;

FIG. 14 is a perspective view of the pre-connectorized trunk assembly of FIG. 13 having a mesh tube placed about the sleeve and partially encased within a pulling sock.

DETAILED DESCRIPTION

Figure 1:
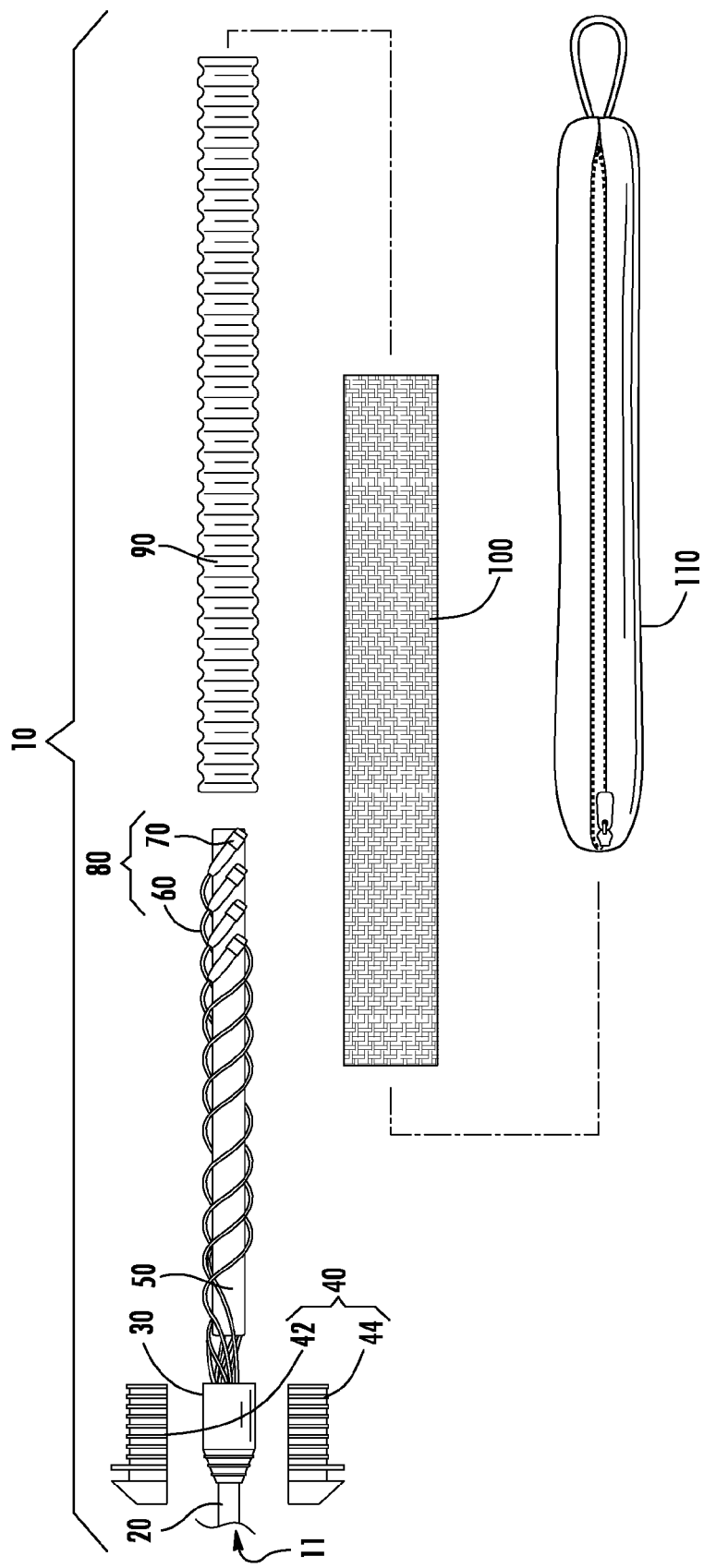
FIG. 1 is a partially exploded view of a pre-connectorized trunk assembly and pulling grip components.

Reference is now made in detail to various embodiments of the disclosure, which are illustrated in the accompanying drawings. Whenever possible, identical or similar reference numerals are used throughout the drawings to refer to identical or similar elements. It should be understood that the embodiments disclosed are merely exemplary with each one incorporating certain benefits of the disclosure. Various modifications and alterations may be made to the following exemplary embodiments within the scope of the disclosure, and aspects of the embodiments may be mixed in different ways to achieve yet further embodiments. Accordingly, the true scope of the disclosure is to be understood from the entirety of the disclosure in view of, but not limited to, the embodiments described.

FIG. 1 is a partially exploded view of a pre-connectorized trunk assembly 10. Trunk assembly 10 may include, in exemplary embodiments, a fiber optic cable assembly 11, and pulling grip components, for example, for pulling assembly 10 along ducts or around sheaves. Cable assembly 11 may include in exemplary embodiments, at least one fiber optic cable 20, at least one furcation body 30 on an end of cable 20 and at least one cable leg 60 disposed opposite cable 20. Cable leg 60 may have a connector on an opposite end, for example, at least on multifiber connector 70. Cable leg 60 and an associated connector 70 comprise at least one connector assembly 80. Cable assembly 11 may include a plurality of connector assemblies 80, for example, 4, 6, 8, 12 or more.

In an exemplary embodiment trunk assembly 10 may include at least one pliable core 50. Pliable core 50 may include a foam, an elastomer or the like for wrapping cable assembly 80, for example, multiple times in a coiling or helical fashion, causing a shorter length than an overall length of cable assembly 50. In exemplary embodiments a plurality of cable assemblies 80 may be wrapped in the same direction around pliable core 50 in such a way as to stagger each of connectors 70 to reduce an overall size of the assembly.

A bendable tube like structure, for example, a corrugated pulling grip sleeve 90 may be applied over the connector assemblies 80 wrapped around pliable core 50. Sleeve 90, in exemplary embodiments, may be resistant to crushing forces yet may bend under bending forces. Sleeve 90 may interface with a pulling grip housing 40, in exemplary embodiments surrounding furcation body 30. A strength member sleeve 100, for example, a woven carbon fiber or similar mesh material may be applied and secured about both pulling grip housing 40 and sleeve 90. Sleeve 100 may, in exemplary embodiments, be resistant to pulling forces yet not add dimensionally to the overall size of assembly 10. Sleeve 90 may be secured to housing 40, for example, by a heat shrink, a compression band, a cable tie or tie-wrap, or some other suitable fastener. Housing 40 may include separate parts, for example, a first housing portion 42 and a second housing portion 44 that may be placed about furcation body 30 and have complimentary internal geometry to accommodate the external geometry of body 30 such that forces applied in at least one axial direction do not permit housing 40 to slip from body 30.

Figure 2:
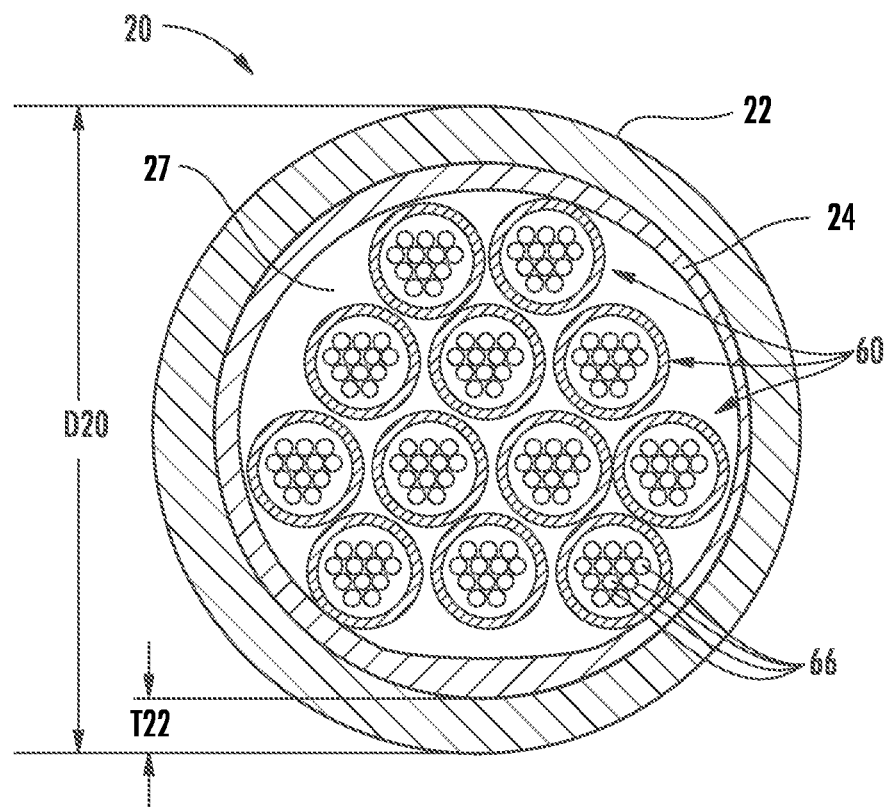
FIG. 2 is a cross-sectional end view of one of an optical cable of the pre-connectorized trunk assembly of FIG. 1.

FIG. 2 is a cross section of an example cable 20 having a diameter D20. Each cable 20 includes its own outer jacket 22 of thickness T22 and that defines an interior 27 that contains a plurality of cable legs 60. Cable legs 60 each include a buffer tube 62 that defines an interior 64 containing at least one optical waveguide such as at least one optical fiber 66. Buffer tube 62 has a thickness D62. Exemplary cable legs 60 are not stranded within the cables 20, although some degree of stranding may be used for certain applications. For example, the cable legs 60 can be twisted in helical fashion with respect to one another, in particular when a plurality of or all of the cable legs 60 are arranged in such a way that they are rotated with a specified lay length. In the present disclosure, any stranding of cable legs 60 (except for that at the furcation point FP, discussed below) is generally considered to be loose, e.g., so that the optical fibers 66 are free to move within their respective buffer tubes 62.

With continuing reference to FIG. 2, a strain-relief element 24 may be disposed in cable interior 27 adjacent jacket 22 and surrounding cable legs 60. Strain-relief element 24 may include, for example, a layer of yarn or yarns (e.g. aramid yarn) for absorbing tensile loads. Strain-relief element 24 is shown with a non-uniform thickness because the locations of the cable legs 60 may cause the strain-relief element to compress at various locations along the length of the cable 20.

Figure 3:
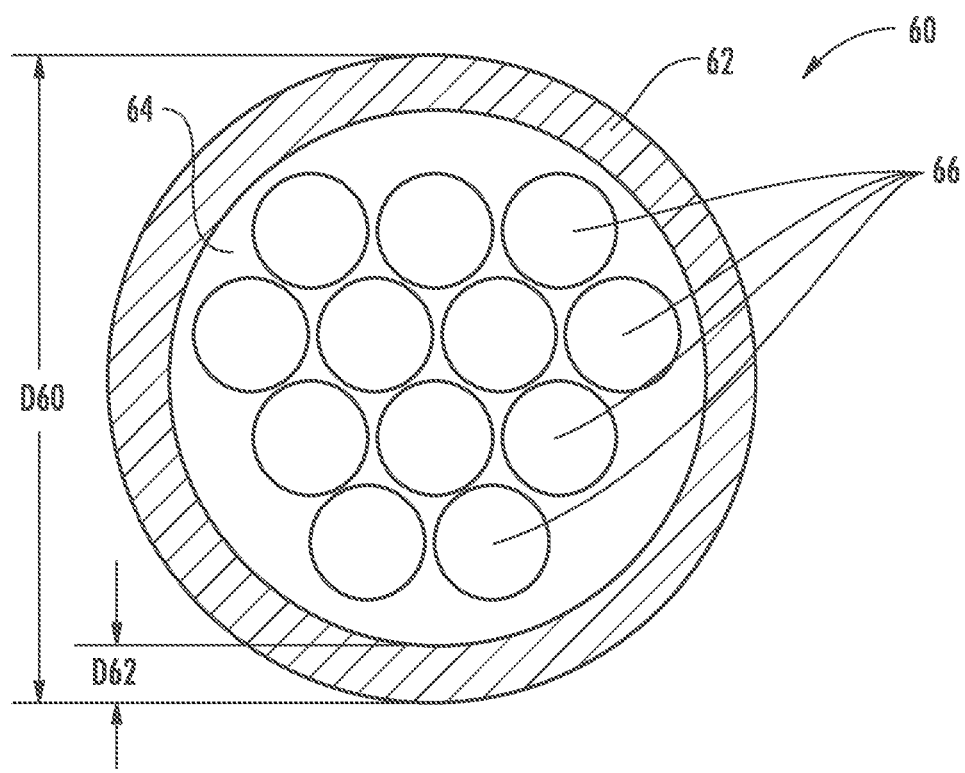
FIG. 3 is a cross-sectional end view of an exemplary cable leg as carried by the optical cable of FIG. 2.

FIG. 3 is a cross section of cable leg 60 having a diameter D60. In an example, buffer tubes 62 are made of a polymer and are formed as a polymeric sheath. Buffer tubes 62 have a thickness D62. In exemplary embodiments a plurality of, for example, twelve (12), optical fibers 66 may be included in interior 64 of cable leg 60.

The furcation assemblies and methods of the disclosure are discussed herein in connection with cable 20 by way of illustration. Cable 20 can be constructed of selected materials of selected thicknesses such that it has riser or plenum burn ratings according to desired specifications. Cable legs 60 can also be constructed so that they are relatively robust, such that they are suitable for field use, while also providing a desired degree of accessibility. For example, cable legs 60 can be constructed with relatively thick buffer tubes 62, e.g., on the order of D62=0.2 millimeters (mm) or more, so that the exposed cable legs that form part of the fiber optic cable furcation assembly (discussed below) provide sufficient protection for the optical fibers 66 contained therein Cable jacket 22 and buffer tubes 62 can also be formed from, for example, fire-retardant materials to obtain a desired plenum burn rating. For example, highly-filled PVC of a specified thickness can be used to form buffer tubes 62. One well-known plenum burn standard is the National Fire Protection Act Standards (NFPA) 262 burn test. NFPA 262 prescribes the methodology to measure flame travel distance and optical density of smoke for insulated, jacketed, or both, electrical wires and cables and fiber optic cables that are to be installed in plenums and other spaces used to transport environmental air without being enclosed in raceways. Cables 20 may be constructed to be low skew within cable legs 60 so that they are suitable for use in parallel optic transmission systems. Skew is generally defined as the difference in the time of flight of optical signals for the fibers within a module and has units of picoseconds per meter (ps/m).

Figure 4:
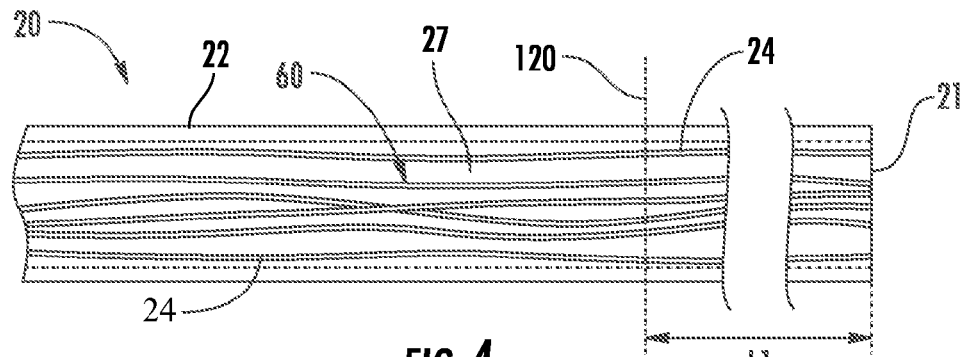
FIG. 4 is a partial cross-sectional side view of a portion of an exemplary optical cable having an end and showing multiple cable legs contained within a cable interior prior to removing a portion of a cable jacket end to expose the cable legs.

FIG. 4 is a side view of an end portion of an example cable 20 having an end 21 and showing cable legs 60 and strain relief members 24 contained within cable interior 27. FIG. 4 also shows a location 120 a distance L1 from end 21 where cable jacket 22 may be cut to form a furcation point (discussed below). The furcation point is formed by removing an end portion of jacket 22 to expose end portions of cable legs 60 in anticipation of connecting the optical fibers 66 (not shown in FIG. 4) carried by the cable legs to one or more multifiber connectors.

Figure 5A:
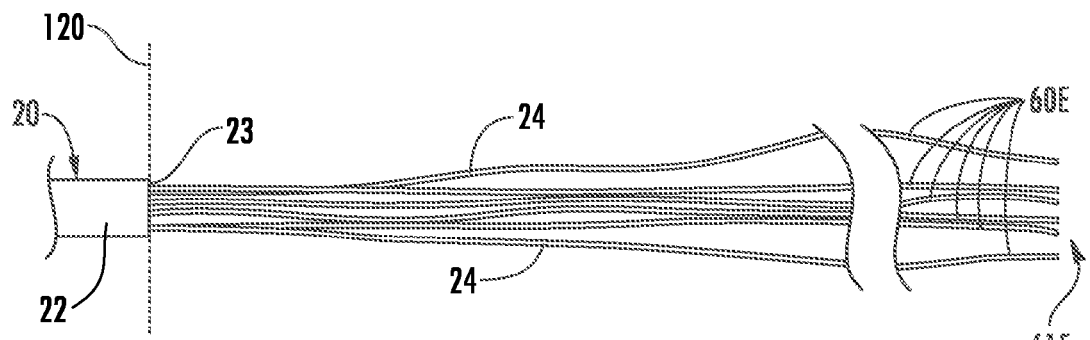
FIG. 5A is a side view of the optical cable of FIG. 4, showing the cable after removal of the portion of the cable jacket end to expose end portions of the cable legs extending from the cable jacket end.
Figure 5B:
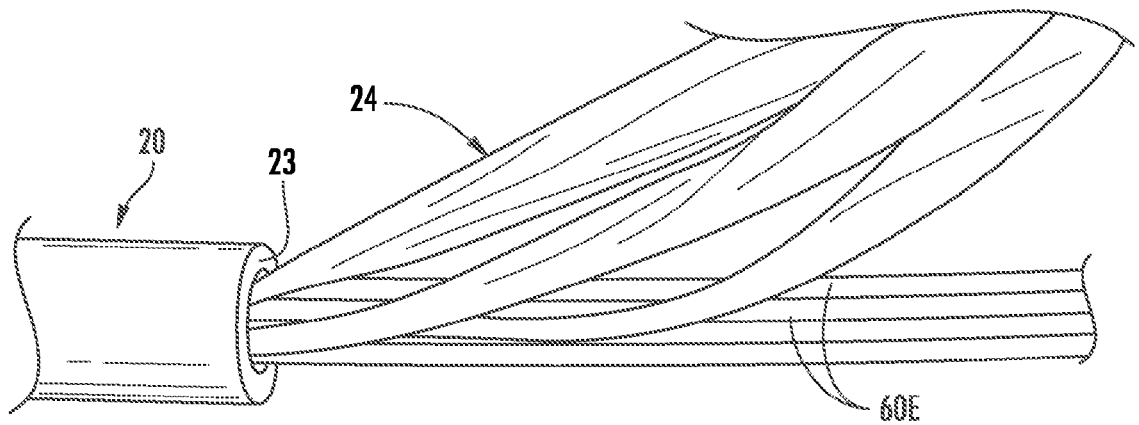
FIG. 5B is a close-up view of an optic cable similar to that of FIG. 5A, showing four exposed cable legs and a yarn strength member at the cable jacket end.

FIG. 5A is a side view of cable 20 and shows the cable after jacket 22 has been cut at location 120 and an end portion of the jacket removed, thereby forming a jacket end 23. This exposes end portions of cable legs 60 and an end portion of strain-relief members 24. Six cable legs 60 are shown in FIG. 5A by way of illustration. FIG. 5B is a close-up perspective view of a cable 20 similar to that of FIG. 5A, wherein the cable is shown carrying four cable legs 60 by way of example, with the four cable legs extending from jacket end 23. Exposed cable legs 60 are denoted 60E and have ends 61E. In FIG. 5B, strain-relief members 24 are shown in the form of yarn by way of illustration.

Figure 6A:
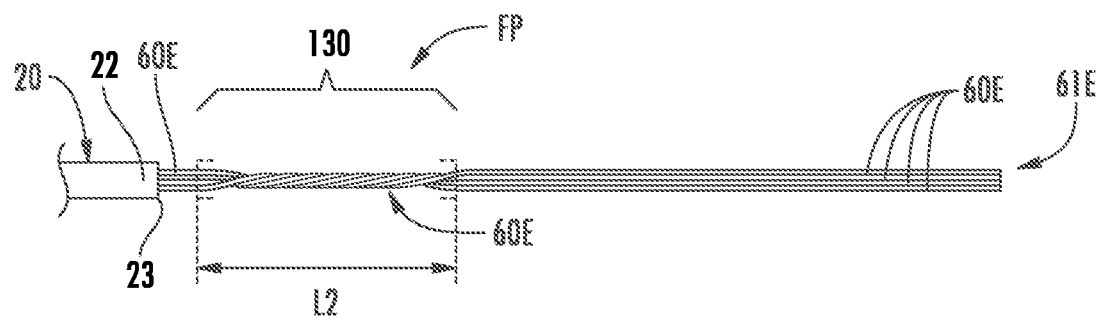
FIG. 6A is a side view of the optical cable of FIG. 5A having the exposed cable legs stranded at a furcation point with a lay length L2.
Figure 6B:
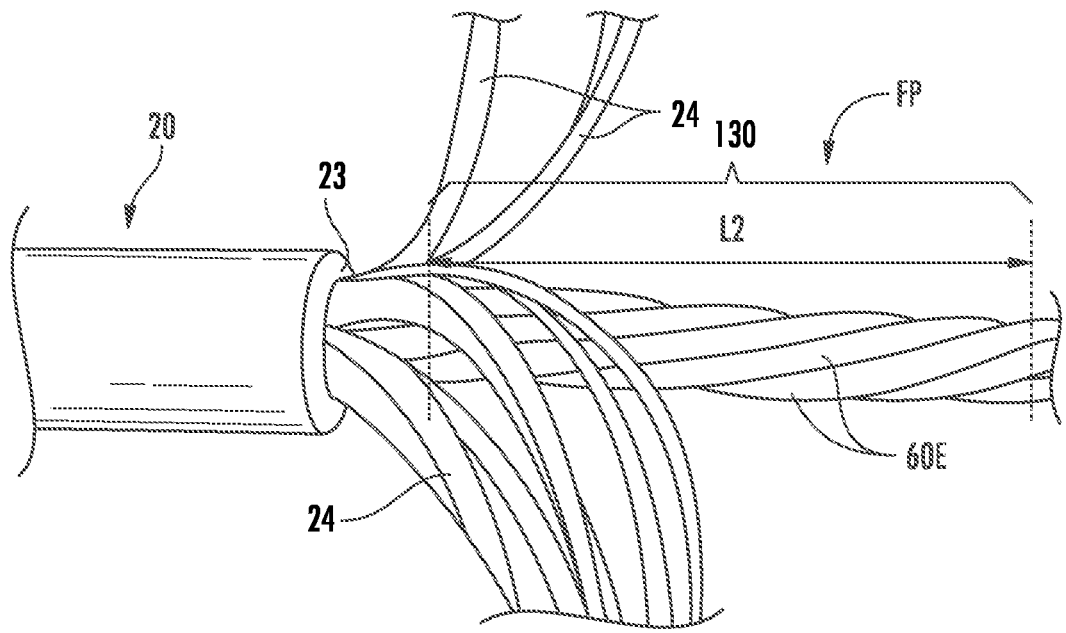
FIG. 6B is a close-up view of the optical cable of FIG. 6A at the cable jacket end and showing the stranded section and the exposed yarn strength member.

FIG. 6A is similar to FIG. 5A, except that the exposed cable legs 60E are now stranded over a stranded section 130 having a lay length L2. FIG. 6B is a close-up view of cable 20 of FIG. 6A at jacket end 23 and shows stranded region 130 and lay length L2. In an exemplary embodiment, exposed cable legs 60E may be unidirectionally and helically stranded in a manner that does not violate the minimum bend radius $R_{MIN}$ of optical fibers 66 within the buffer tubes 62, but that provides sufficient contact between the optical fibers and their respective buffer tubes to substantially immobilizing the optical fibers within the buffer tubes. The cable jacket end 23 and stranded section 130 of stranded cable legs 60E generally define the furcation point FP. In an example, stranded section 130 is located immediately adjacent cable jacket end 23, or is relatively close thereto, and the furcation point may further include 20 mm of the end of the cable jacket. In an example, exposed cable legs 60E are stranded by hand to form stranded section 130.

The bending radius R of the cable legs 60 when helically stranded in a single direction may be calculated using the equation:

$$R = \left(\frac{P^2}{2\pi^2 D'}\right) + \left(\frac{D'}{2}\right),$$

Where P is the pitch or lay length, and D' is the pitch circle diameter. In an example, exposed cable legs 60E are helically wound in a single direction with at least three helical wraps (turns) to provide sufficient contact between optical fibers 66 and their buffer tubes 62 to substantially immobilize the optical fibers. In example embodiments, the pitch/lay length P=L2 as denoted in the pertinent Figures is in the range of 10 mm≤L2≤100 mm, or preferably 15 mm≤L2≤50 mm, or more preferably in the range of 15 mm≤L2≤20 mm.

By way of example, for exposed cable legs 60E stranded with a pitch/lay length P=L2=17 mm with a pitch circle diameter D'=16 mm (which is an example buffer tube diameter), the bend radius R is about 37 mm, which is substantially larger than the minimum bend radius $R_{MIN}$ for most optical fibers 66. Consequently, this amount of bending would not lead to significant bend-induced attenuation. Example optical fibers 66 include multi-mode, bend-insensitive optical fibers, such as the CLEAR CURVE® optical fiber, available from Corning, Inc., Corning, N.Y.

Figure 7:
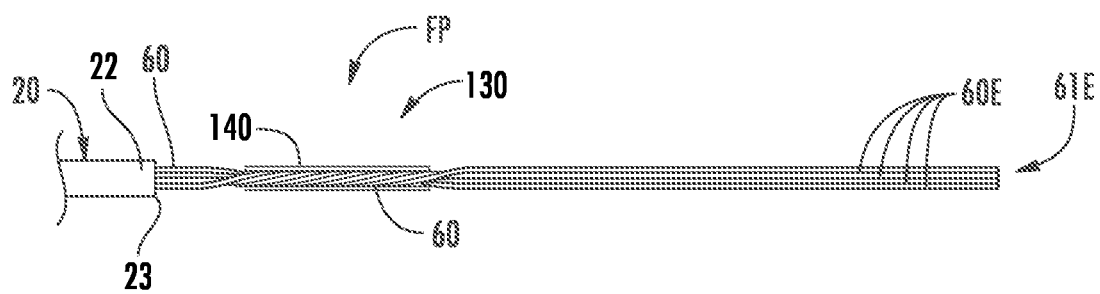
FIG. 7 is a side view of the optical cable of FIG. 6A including a maintaining member applied to the stranded cable legs at the furcation point.

FIG. 7 is a side view of cable 20 after exposed cable legs 60E are stranded as discussed above, and shows a maintaining member 140 arranged on (e.g., applied to) the stranded exposed cable legs 60E at furcation point FP over at least a portion of stranded section 130 to maintain the cable legs in their stranded configuration. In an example, maintaining member 140 extends the entire lay length L2 of stranded section 130. Examples of maintaining member 140 include tape, strapping, shrink tubing, shrink-wrap, binder, yarn, epoxy, urethane sealant, adhesive material, and combinations thereof.

Figure 8:
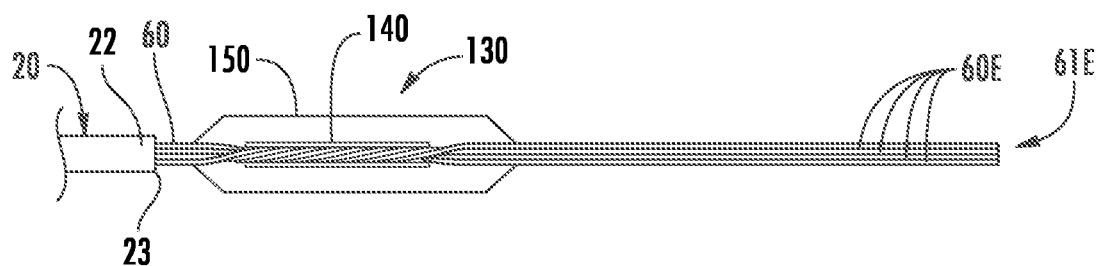
FIG. 8 is a side view of the optical cable of FIG. 7 having a furcation body added at the furcation point over the maintaining member.

FIG. 8 is similar to FIG. 7 and illustrates an example where a furcation body 150 is optionally added at furcation point FP, i.e., is disposed on (e.g., secured to, fixed to, etc.) at least a portion of maintaining member 140. Furcation body 150 adds protection to the stranded, exposed cable legs 60E at furcation point FP and can also serve to further secure the exposed cable legs in their stranded configuration. Furcation body 150 can also facilitate handling of the final cable assembly by providing a gripping/handling location for use by field personnel. In an example, furcation body 150 extends beyond stranded section, as shown in FIG. 8.

Figure 9:
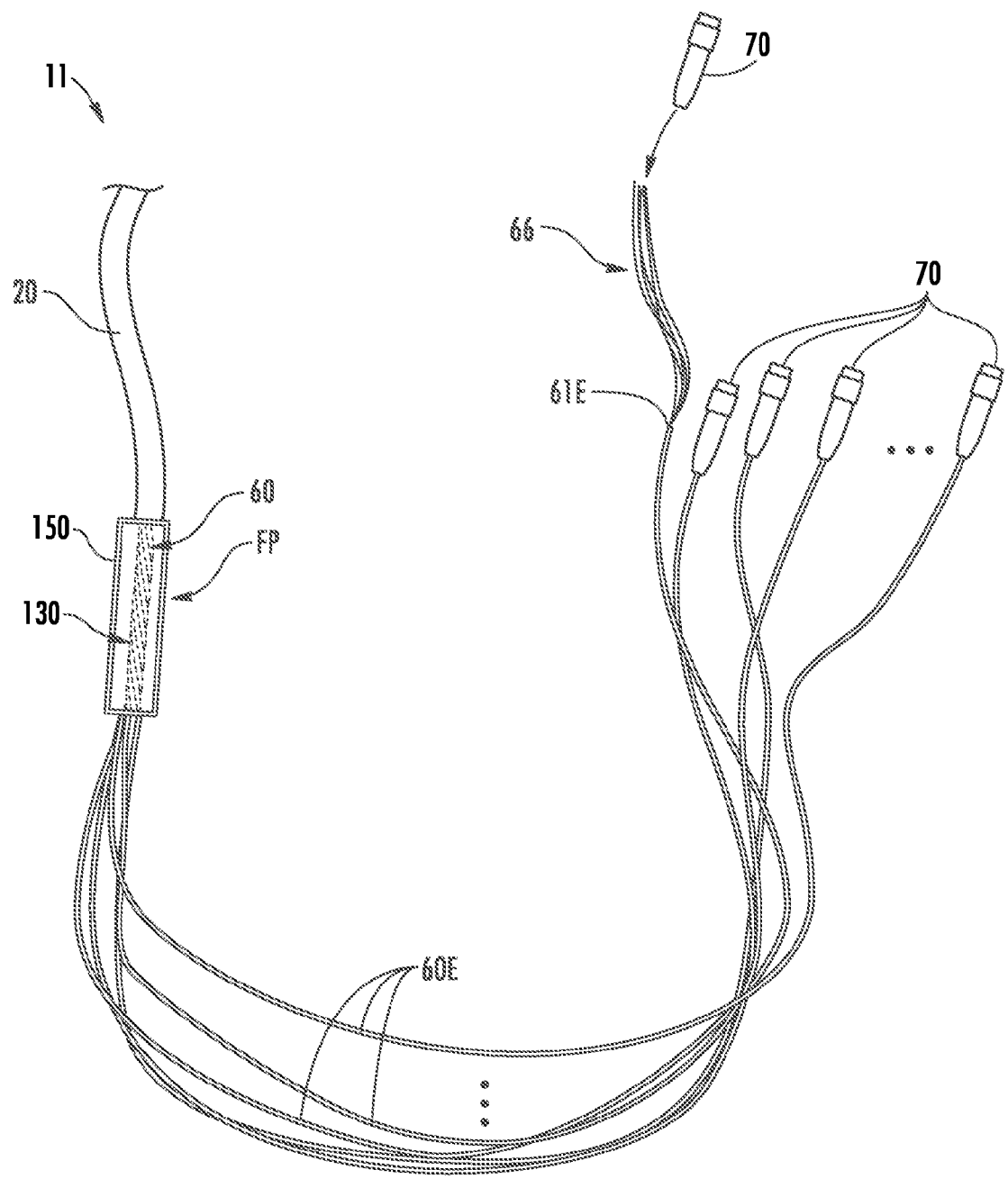
FIG. 9 is a side view of the optical cable of FIG. 8 having the furcation body and the exposed cable legs, having exposed optical fibers, being connected to respective multifiber connectors.

FIG. 9 is a schematic diagram of the cable 20 after furcation body 150 is added and wherein the optical fibers 66 carried in the exposed cable legs 60E are in the process of being connected to respective multifiber connectors 70 to form a connectorized cable assembly 11. One multifiber connector 70 is shown as awaiting connection to the exposed optical fibers 66 of one of the exposed cable legs 60E. An example multifiber connector 70 is an MTP connector. Also in an example, the optical fibers 66 in a given buffer tube 62 are connected to a corresponding multifiber connector 70.

Figure 10:
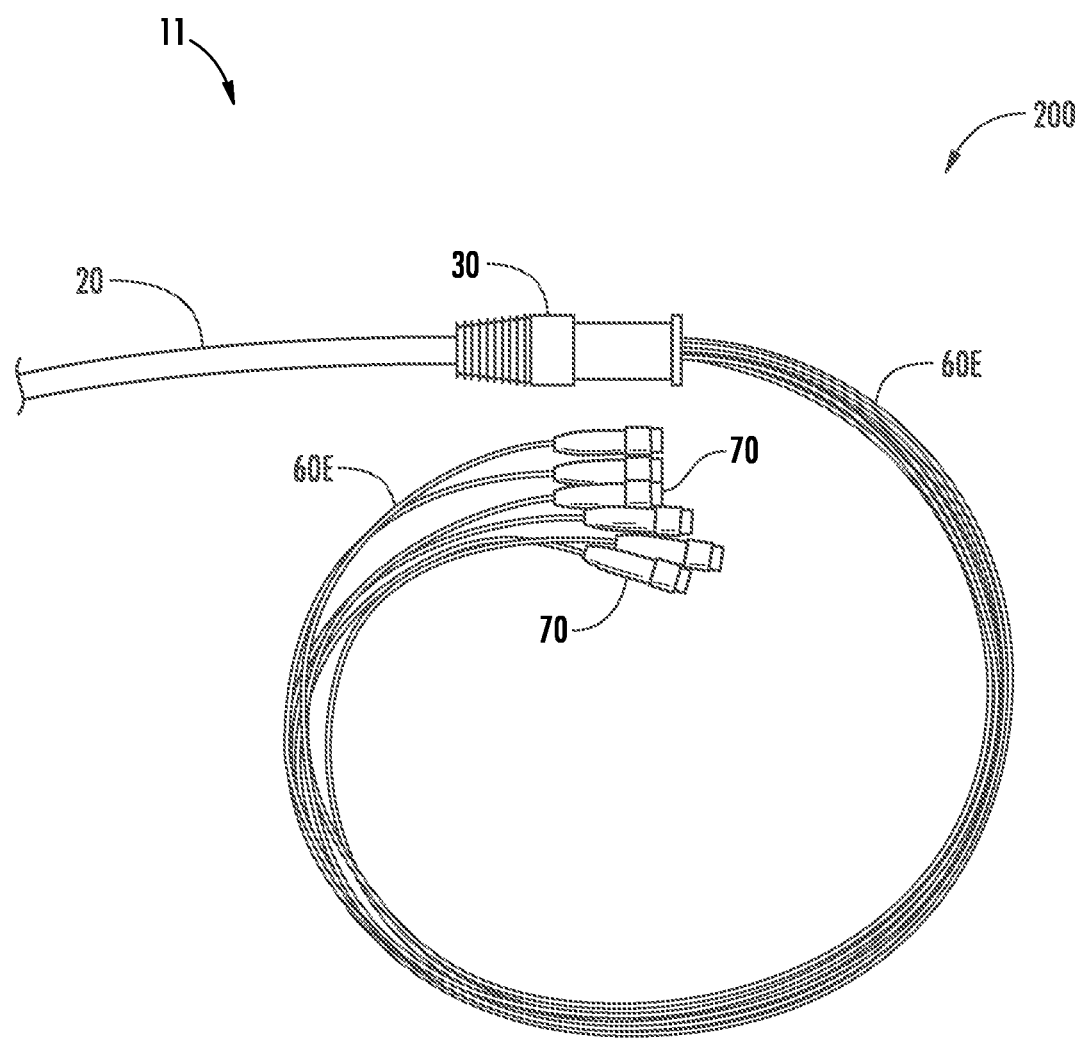
FIG. 10 is side view of an exemplary pre-connectorized trunk assembly including an optical cable having the stranded section and multifiber connectors connected to the optical fibers at respective ends of the exposed cable legs.

FIG. 10 is side view of a completed connectorized cable assembly 11 comprising cable 20 having stranded section 130 and multifiber connectors 70 connected to optical fibers 66 at the ends of the exposed cable legs 60E.

Alternatives to the embodiment of FIG. 1 could be, for example, the use of non-normal helical routings (a normal helix being around a cylindrical core, generally with a fixed pitch). Variations would include, for example, changes in diameter of a representative pliable core and the pitch on a single helix and the use of opposing helix (or helix variants). By way of example, FIG. 11 is a side view of such an exemplary pre-connectorized trunk assembly 13 having connectorized cable legs wrapped around pliable core 50 in different orientations H1 and H2.

In the present embodiments, the minimum bend radius is not exceeded due to the physical presence of the foam core which is sufficiently sized to be larger than the minimum bend radius. The minimum bend radius of a helix is the radius of the core. The bend radius is greatly increased as the pitch is increased. The curvature k may be:

$$k = \frac{r}{r^2 + \left(\frac{P}{2\pi}\right)^2},$$

Providing a radius of curvature that may be 1/k:

$$\frac{1}{k} = \frac{r^2 + \left(\frac{P}{2\pi}\right)^2}{r},$$

From inspection, when P=0, the radius of curvature is r, and for any other value of P, the radius of curvature is larger.

Leg Staggering—By wrapping the legs around a core and increasing the pitch (spacing of legs) along the length, a stagger in the connector ends can be achieved. With staggered connectors, the end diameter is potentially much smaller than a bundle of connectors.

The arc length of a helix may be represented by the equation:

$$A = N2\pi \sqrt{r^2 + \left(\frac{P}{2\pi}\right)^2}$$

Where A is the arc length of the helix, r is the radius, and P is the pitch and N is the number of rotations. For the embodiments of the disclosure the radius of the core, the number of rotations and the leg length may be constant, but the pitch can be varied per leg so that the arc length traveled by each leg is different causing the ends to land in staggered locations. Because the equation is non-linear, it is not possible to solve directly for the difference in pitch lengths for a difference in arc lengths implicitly, but iterative solutions may be used.

By way of example, the following algorithm may be followed to achieve a connector stagger (d(L-A)) spacing of 2 inches for a radius(r)=0.75 inches, number of rotations(N)=4 turns, leg length(L)=36 inches. Pitch(P) of 1 may be tried. A, L-A, and d(L-A) and P may then varied from leg to leg to get d(L-A), the spacing between leg ends, near the desired 2 inches.

TABLE 1

| N | r | L |
|---|---|---|
| 4 | 0.75 | 36 |

| P | A | L - A | d(L - A) |
|---|---|---|---|
| 1 | 19.27 | 16.73 | |
| 2.5 | 21.34 | 14.66 | 2.07 |
| 3.5 | 23.48 | 12.52 | 2.14 |
| 4.3 | 25.52 | 10.48 | 2.04 |
| 5 | 27.48 | 8.52 | 1.97 |

In the exemplary embodiments a generally cylindrically shaped solid or hollow cores may be used. However, many variations in core shape, size, and designed in features are numerous and may be contemplated, for example, conical taper, hourglass shape, pockets (recesses) or slits designed in to hold connectors, paths cut in to allow for easy routing of legs, "U" shaped design, for example, folding the cylinder into a "U" shape so the connectors end up near the furcations, meaning a larger "diameter" grip, but shorter length, and the use of multiple cores for furcated legs. In one embodiment and by way of example, as seen in FIG. 12 in a side view, another pre-connectorized trunk assembly 15 may have connectorized cable legs 60 wrapped around an alternate 55 pliable core and having respective multifiber connectors 70 tucked into at least one receiving slot 56 of alternate core 55.

Figure 13:
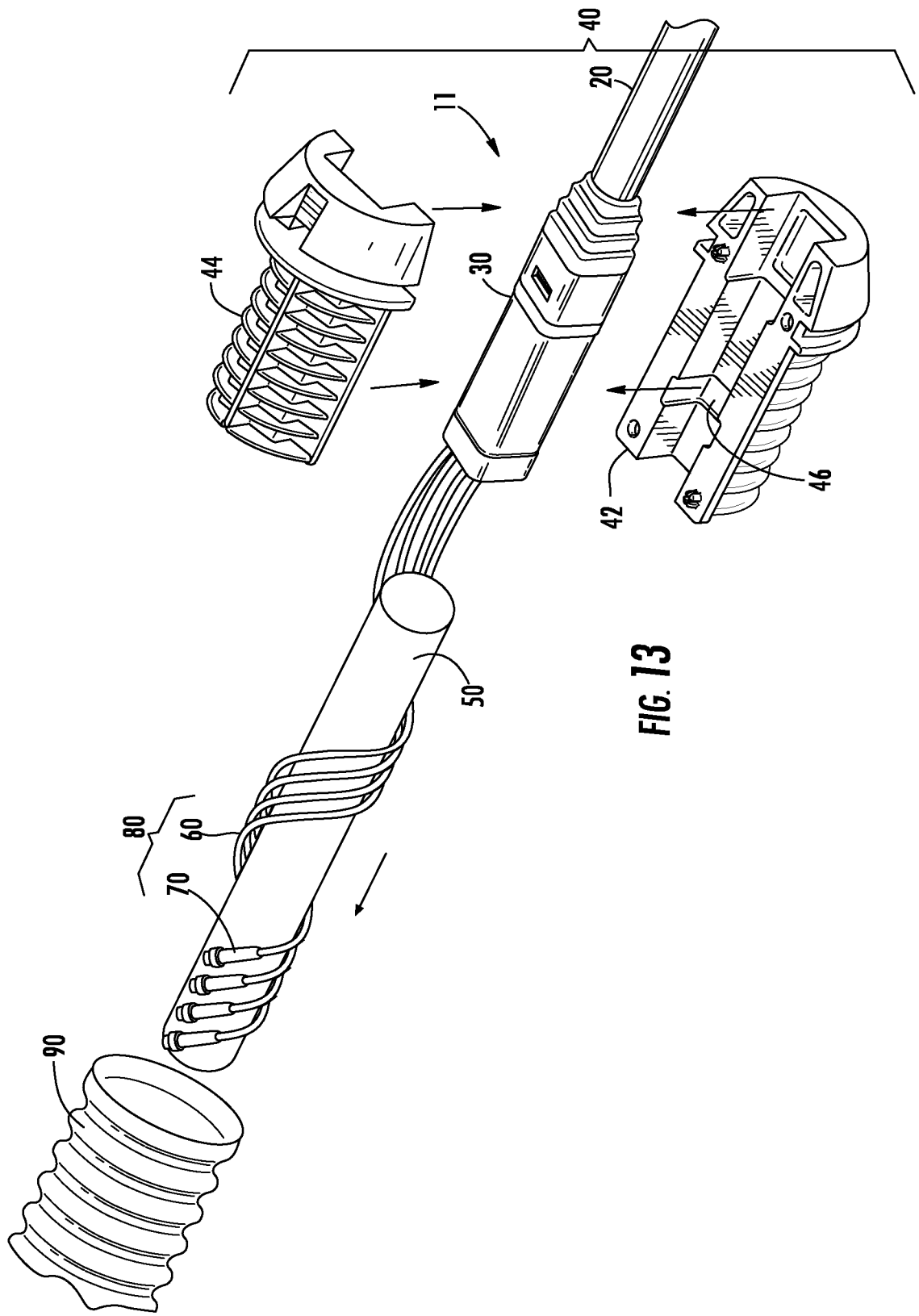
FIG. 13 is a perspective view of yet another exemplary pre-connectorized trunk assembly having connectorized cable legs wrapped around a pliable core ready to be received by a pair of coupler halves and a sleeve.

Other variations of the pulling grip disclosed herein are also possible. For instance, the pulling grip housing may omit the locking feature with the pulling grip sleeve and provide the anti-rotation feature in other ways. By way of example, FIG. 13 depicts a perspective exploded view of a pulling grip 40 that is similar to other embodiments having a pulling grip sleeve 90 and a pulling grip housing 40. Pulling grip housing 40 may include a first housing portion 42 that is configured to mate with a second housing portion 44. An internal cavity 46 may be formed inside the pulling grip housing 40 above for receiving the furcation plug 30 as disclosed in one or more of the embodiments described. By way of example, internal cavity 46 may include one or more notches or recesses that are tailored for fitting with the profile of the furcation body of the fiber optic assembly for transferring pulling forces thereto. In other embodiments, the first housing portion 42 may be hingedly attached or connected together in a suitable fashion to the second housing portion 44 to use fewer parts and/or reduce the risk of misplacing a portion of the pulling grip housing.

In exemplary embodiments, pulling grip housing 40 may not have a locking feature with pulling grip sleeve 90. However, pulling grip 10 still provides an anti-rotation feature for the fiber optic assembly 11 being pulling in by the craft. Specifically, the anti-rotation feature is provided by the friction fit between the outer portion of the pulling grip housing 40 and a portion of the inner surface of the pulling grip sleeve 90. The friction fit between the pulling grip housing 40 and the inner surface of pulling grip sleeve 90 advantageously inhibits twisting of fiber optic assembly 11 within the sleeve during installation. Pulling grip housing 40 is also shown with a ribbed construction (not numbered), which advantageously reduces the amount of material compared with a similarly sized part.

Pulling grip sleeve 90 may be a corrugated tube (e.g., with ridges) for providing flexibility and crush resistance, but other types of pulling grip sleeves are possible. For instance, the use of a smooth wall tube is possible. Other variations for the pulling grip housing, the fiber optic assembly, and the like may be incorporated into this embodiment as disclosed.

In exemplary embodiments, pulling grip 40 may include a pulling sock 110 placed over the pulling grip sleeve 90, allowing attachment of a fish tape or line to the pulling sock loop 114 for pulling the fiber optic assembly into place. Simply stated, the distal end of pulling sock 110 may be necked down such as with a conical portion 118 for engaging with the a portion of the pulling grip housing and/or pulling grip sleeve so that the pulling force is transferred to the furcation body/strength members or other suitable portion of the fiber optic assembly 11. In use, an end portion of fiber optic assembly 11 such as the furcation body is placed within the pulling grip housing 40 such as discussed in one of the several embodiments above. Next, the connectorized end of the fiber optic assembly is inserted into the pulling grip sleeve 90 so that a portion of the pulling grip housing 40 fits within the pulling grip sleeve 90. Unlike conventional pulling grips, the pulling grip housings disclosed only fit over a small portion of fiber optic assembly 11. In other words, the pulling grip housing does not fit over the connectors of fiber optic assembly 11, thereby allowing a flexible pulling grip. Additionally, the connectorized end of fiber optic assembly 11 may include a protective layer such as a plastic wrap or the like and to aid the insertion into the pulling grip sleeve. Thereafter, the assembly is placed within the pulling sock 110 so that the conical portion 118 of the pulling sock 110 engages pulling grip housing 40 and then is properly secured thereabout. Consequently, the craft can route and attach a fish tape or line to loop 114 of pulling sock 110 for installation. Furthermore, any of the embodiments discussed herein can be assembled and packaged on a reel in the factory for quick and easy deployment in the field.

As illustrated in FIG. 14, pulling sock 110 may also be provided and placed over the pulling grip sleeve 18 to further facilitate pulling of the pulling grip 10. Pulling sock 110 may include a front conical portion 118 that is shaped essentially like the front portion of the pulling grip housing 40 when the first housing portion 22 is mated to the second housing portion 24. The pulling sock 110 contains an opening 112 to allow the fiber optic cable 20 to pass therethrough while retaining the pulling grip housing 20 inside the pulling sock 110. A pulling sock loop 114 may be disposed on a second end 116 of the pulling sock 110 to facilitate pulling of the pulling grip sleeve 18 and thus the fiber optic cable 20. The pulling sock 110 may include a zipper 117 or other attachment means such that it can be opened and disposed laterally around the pulling grip sleeve 18 and the pulling grip housing 20. The pulling sock 110 may be constructed out of any material, including but not limited to a polymer, metal, filament, and provided in any form, including but not limited to a solid material, mesh, and composite.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A cable assembly, the assembly comprising:
   at least one fiber optic trunk cable, the at least one fiber optic trunk cable including a jacket and at least one optical fiber extending beyond the jacket;
   at least one cable leg having a first length, the at least one cable leg being associated with the fiber optic trunk cable and containing the at least one optical fiber;
   at least one connector assembly, the at least one connector assembly in communication with the at least one optical fiber and being operatively connected to an end the at least one cable leg; and
   at least one pliable core having a second length, the at least one pliable core associated with the at least one cable leg, the cable leg being wrapped at least one time around the at least one pliable core, the second length being shorter than the first length, and the at least one pliable core having an aperture extending radially from an outer surface to an interior portion for at least a portion of the second length.

2. The cable assembly of claim 1, the at least one cable leg including a plurality of cable legs, each cable leg generally having the first length.

3. The cable assembly of claim 2, each of the plurality of cable legs being wrapped a different number of times from each other, resulting in a different relative pitch for each of the plurality of cable legs.

4. The cable assembly of claim 3, the at least one connector assembly being operatively connected to each of the plurality of cable legs, the connector assemblies being arranged along the pliable core in a generally staggered fashion.

5. The cable assembly of claim 1, the at least one connector assembly being at least partially inserted into the aperture.

6. The cable assembly of claim 5, a plurality of connector adapters being at least partially inserted into the aperture.

7. The cable assembly of claim 6, the plurality of connector adapters being at least partially inserted into the aperture along the second length.

8. A method of making a cable assembly, the method comprising the steps of:
   providing a furcated optical cable assembly, the furcated optical cable assembly including at least one trunk cable, at least one furcation point and a plurality of cable legs each having at least one optical connector on an end;
   placing at least one pliable core proximal to the furcation point;
   staggering the optical connectors relative to one another along the at least one pliable core; and
   wrapping the plurality of cable legs around the at least one pliable core, causing the at least one optical connector to be a distance from the furcation point.

9. The method of claim 8, including the step of tucking the staggered optical connectors into a slot disposed in the at least one pliable core.

10. The method of claim 8, including the step of installing a coupler about the furcation point.

11. The method of claim 10, including the steps of:
    providing a convoluted sleeve; and
    inserting the wrapped pliable core into the convoluted sleeve.

12. The method of claim 10, including the step of installing a mesh about the convoluted sleeve.

13. The method of claim 10, including the step of installing a pulling sock about the coupler, the sleeve, the expandable mesh, and the wrapped pliable core to make the cable assembly.

14. A method of making a cable assembly, the method comprising the steps of:
    providing a furcated optical cable assembly, the furcated optical cable assembly including at least one trunk cable, at least one furcation point and at least one cable leg having at least one optical connector on an end;
    providing a coupler;
    providing a convoluted sleeve;
    providing an expandable mesh;
    providing a pulling sock;
    providing at least one pliable core;
    wrapping the at least one cable leg around the at least one pliable core, causing the at least one optical connector to be a distance from the furcation point;
    installing the coupler about the furcation point;
    inserting the wrapped pliable core into the convoluted sleeve;
    mating the convoluted sleeve to the coupler;
    sliding the expandable mesh over the convoluted sleeve;
    securing the expandable mesh to the coupler and the convoluted sleeve; and
    installing the pulling sock about the coupler, the sleeve, the expandable mesh, and the wrapped pliable core to make the cable assembly.

15. A method of making a cable assembly, the method comprising the steps of:
    providing a furcated optical cable assembly, the furcated optical cable assembly including at least one trunk cable, at least one furcation point and at least one cable having at least one optical connector on an end;

placing at least one pliable core proximal to the furcation point;

wrapping the at least one cable leg around the at least one pliable core, causing the at least one optical connector to be a distance from the furcation point;

installing a coupler about the furcation point providing a convoluted sleeve inserting the wrapped pliable core into the convoluted sleeve; and installing a mesh about the convoluted sleeve.

16. The method of claim 15, including the step of installing a mesh about the convoluted sleeve.

17. The method of claim 16, including the step of installing a pulling sock about the coupler, the sleeve, the expandable mesh, and the wrapped pliable core to make the cable assembly.

\* \* \* \* \*